US008029200B2

(12) United States Patent
Miyashita et al.

(10) Patent No.: US 8,029,200 B2
(45) Date of Patent: Oct. 4, 2011

(54) PRINTING APPARATUS WHICH ELIMINATED COMPLEXITY OF POWER-ON OPERATION AND CAN ENTER IN PRINT PREPARATION WHEN PRINT IS ENABLED

(75) Inventors: Tomoki Miyashita, Nagoya (JP); Naruhito Muto, Ama-gun (JP); Satoru Moriyama, Iwakura (JP); Jun Jiang, Suita (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 959 days.

(21) Appl. No.: 11/794,404

(22) PCT Filed: Oct. 24, 2005

(86) PCT No.: PCT/JP2005/019471
§ 371 (c)(1),
(2), (4) Date: Dec. 17, 2007

(87) PCT Pub. No.: WO2006/070528
PCT Pub. Date: Jul. 6, 2006

(65) Prior Publication Data
US 2008/0095563 A1    Apr. 24, 2008

(30) Foreign Application Priority Data

Dec. 28, 2004  (JP) ................. 2004-378429

(51) Int. Cl.
*B41J 3/42* (2006.01)
(52) U.S. Cl. ............... 400/74; 399/37; 399/88; 399/89; 347/60; 347/185; 347/186
(58) Field of Classification Search .............. 400/74; 399/37, 88, 89; 347/185, 186, 60
See application file for complete search history.

(56) References Cited

U.S. PATENT DOCUMENTS

| 5,821,977 A | 10/1998 | Nishimura |
| 5,828,462 A * | 10/1998 | Hashimoto et al. ......... 358/296 |
| 5,897,252 A * | 4/1999 | Kanakubo ...................... 400/74 |
| 5,911,527 A * | 6/1999 | Aruga et al. .................. 400/149 |
| 6,045,274 A | 4/2000 | Nakanishi |
| 6,081,663 A * | 6/2000 | Takahashi et al. ............. 703/20 |
| 6,334,719 B1 | 1/2002 | Kimura |
| 6,621,587 B1 | 9/2003 | Nagaoka |

(Continued)

FOREIGN PATENT DOCUMENTS

CN    1151537 A    6/1997

(Continued)

*Primary Examiner* — Matthew G Marini
(74) *Attorney, Agent, or Firm* — Day Pitney LLP

(57) ABSTRACT

A printing apparatus includes a detection signal receiving device that receives a detection signal from a computer; where a printable condition determining device subsequently determines whether a predetermined printable condition is satisfied; where a power-ON device subsequently turns-ON the main power supply of the printing apparatus; and where a control device subsequently executes print preparation processing; wherein when the power-ON device turns-ON the main power supply of the printing apparatus, the printing apparatus is in sleep mode or energy saving mode in which electric power is supplied only to the control device and the detection signal receiving device; and the printing apparatus includes a power supply portion equipped with a battery, and when a power supply is started, first, the printing apparatus turns into sleep mode or energy saving mode in which electric power is supplied only to the control device and the detection signal receiving device.

12 Claims, 3 Drawing Sheets

U.S. PATENT DOCUMENTS 6,895,196 B2 * 5/2005 Uchizono et al. ............... 399/75
7,062,191 B2 6/2006 Matsukura

FOREIGN PATENT DOCUMENTS

| CN | 1519690 A | 8/2004 |
|---|---|---|
| EP | 0 725 471 A2 | 8/1996 |
| JP | 6091964 | 4/1994 |
| JP | 11-184645 A | 7/1999 |
| JP | 2002-67440 A | 3/2002 |
| JP | 2002-86843 | 3/2002 |
| JP | 2002178610 | 6/2002 |
| JP | 2002-236562 A | 8/2002 |

* cited by examiner

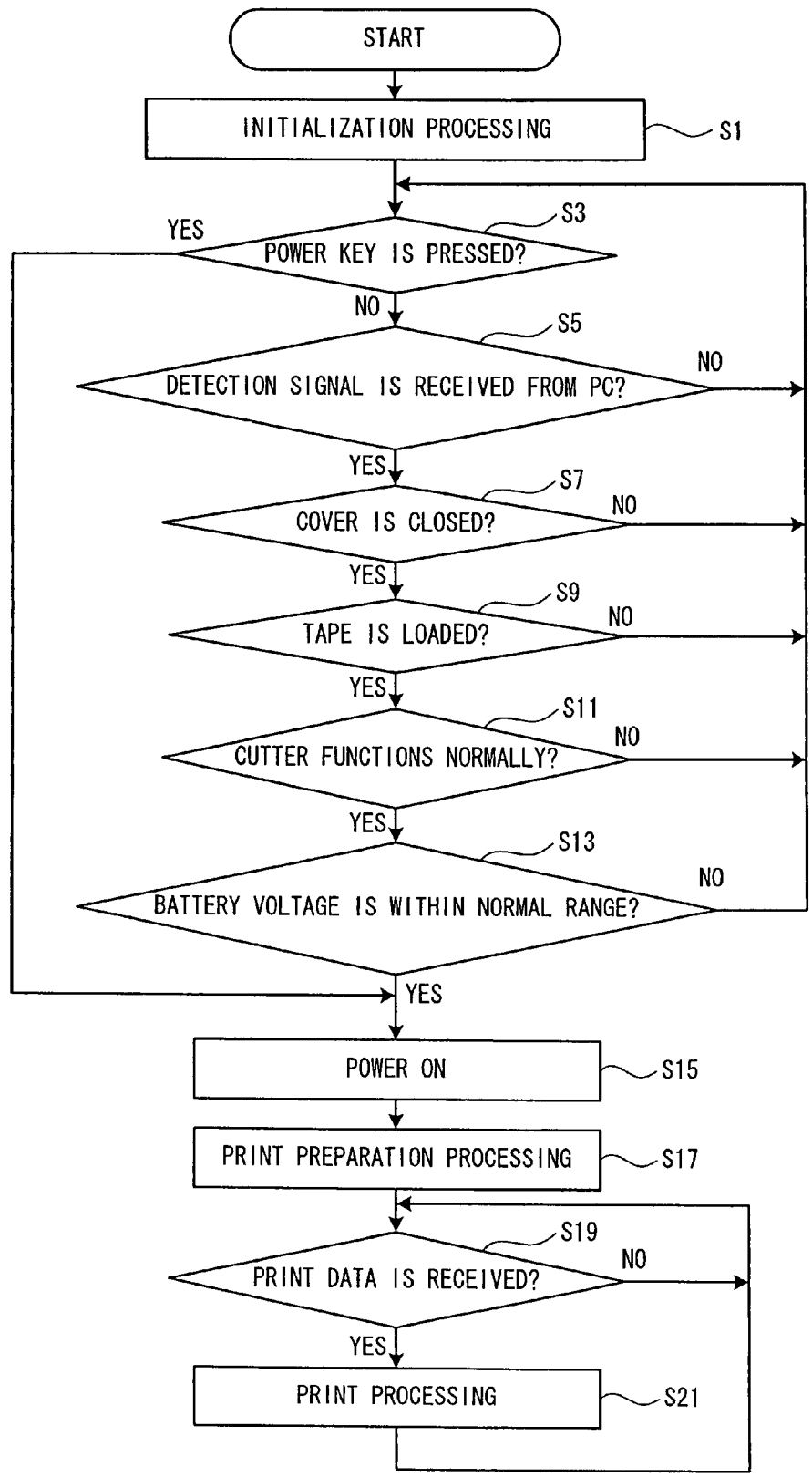

PRINTING APPARATUS WHICH ELIMINATED COMPLEXITY OF POWER-ON OPERATION AND CAN ENTER IN PRINT PREPARATION WHEN PRINT IS ENABLED

TECHNICAL FIELD

The present invention relates to a printing apparatus.

BACKGROUND ART

Generally, if a printing apparatus is connected to a computer and print is executed by means of the printing apparatus following a print instruction from the computer, the operator needs to turn on each power supply of the computer and the printing apparatus before the print is started because the power turning ON/OFF section of the computer and the power turning ON/OFF section of the printing apparatus are provided individually. Although this is not so serious problem if the computer and the printing apparatus are provided in the vicinity, if it is connected via the network, the operator sometimes sends a print instruction without noticing that the power of the printing apparatus is turned OFF, resulting in wasting of time, or there is inconvenience in turning ON the power supply located far away.

For example, patent document 1 has disclosed a method capable of automatically turning ON the power switch of the printing apparatus by detecting a connection between a host unit and a printing apparatus. If the host unit and the printing apparatus are connected to each other through a USB connection, whether or not the USB cable is connected to the connector of the unit main body is checked by detecting rising or falling of the data line of the USB cable in a predetermined time period, and if the connection is detected, power ON processing is executed.

[Patent Document 1] Japanese Patent Application Laid-Open No. 2002-178610

DISCLOSURE OF THE INVENTION

Problem to be Solved by the Invention

However, because according to the above-described method, the main power supply is turned ON only when the host unit and the printing apparatus are connected to each other, the power happens to be turned ON, for example, even when the main body cover is removed, printing papers have run through, or the quantity of remainder is small, resulting in that print preparation processing such as warning-up of the print head after the power supply is turned ON is started, thereby wasting the energy in waste.

An object of the present invention is to provide a printing apparatus which eliminates the complexity of power-ON operation and can enter into print preparation when print is enabled.

Means for Solving the Problem

To achieve the above-described object, the printing apparatus of the present invention is a printing apparatus connected to a computer and for printing on a substrate by actuating a print head based on print data sent from the computer, comprising: detection signal receiving means for receiving a detection signal for detecting the printing apparatus transmitted from the computer; printable condition determining means which, when the detection signal is received by the detection signal receiving means, determines whether or not a predetermined printable condition is satisfied; power-ON means which, when it is determined that the printable condition is satisfied by the printable condition determining means, turns ON the main power supply of the printing apparatus; and control means for executing print preparation processing after the main power supply is turned ON by the power-ON means.

In the printing apparatus of the present invention, the control means may heat the print head after the main power supply is turned ON by the power-ON means.

In the printing apparatus, the printable condition determining means may determine that the predetermined printable condition is satisfied when a substrate is loaded properly on the printing apparatus.

In the printing apparatus, the printable condition determining means may determine that the predetermined printable condition is satisfied when the main body cover of the printing apparatus is closed.

In the printing apparatus, the printable condition determining means may determine that the predetermined printable condition is satisfied when the cutting means is functioning normally in cutting a substrate.

In the printing apparatus, the printable condition determining means may determine that the predetermined printable condition is satisfied when a battery functions normally.

Effect of the Invention

The printing apparatus of the present invention determines whether or not the predetermined printable condition is satisfied when it receives a detection signal from a computer connected thereto and only when it is satisfied, the main power supply is turned on to execute print preparation processing. Thus, only if the system is connected to the computer even if the operator does not turn ON the power supply, whether or not the predetermined print condition is satisfied is automatically checked, and then the main power supply is turned ON. Consequently, such a fault that the system may enter into print preparation with part of the conditions not satisfied thereby wasting of energy can be prevented, and further, the system can enter into the print preparation earlier than the power is turned ON before starting the print, thereby reducing the time until the print is started.

Further, the printing apparatus of the present invention heats the print head as a print preparation process when the main power supply is turned ON. A print head in which print quality is affected by ambient temperature like a thermal head can maintain the print quality without any complicated print control even when printing is started immediately by preheating before the print is started. In this type of print head, wasting of power can be prevented by preheating only when the print is enabled. Although a known laser printer coincides with immediate print by always heating a fixing device which is one of major components constituting the print head, the present invention can prevent wasting of electric power by heating only when the print is enabled.

The printing apparatus of the present invention checks whether or not a substrate is loaded on the printing apparatus properly as a printable condition. If the substrate is loaded properly, not so much waste is produced in print preparation. Accordingly, the time required until print is started can be reduced while avoiding the waste.

The printing apparatus of the present invention checks whether or not the main body cover of the printing apparatus is closed as a printable condition. If the main body cover is closed, not so much waste is produced in print preparation.

Accordingly, the time required until print is started can be reduced while avoiding the waste.

The printing apparatus of the present invention checks whether or not the cutting means for cutting a substrate functions properly as a printable condition. If the cutting means is functioning, not so much waste is produced in print preparation. Accordingly, the time required until print has started can be reduced while avoiding the waste.

Further, the printing apparatus of the present invention checks whether or not the battery functions properly as a printable condition. If the system is so constructed that the main power supply is turned ON after whether or not the battery functions properly is checked particularly when it is driven by the battery, wasting of electric power can be suppressed.

Best Mode for Carrying out the Invention

Next, the embodiments for carrying out the invention will be described with reference to the accompanying drawings. As the printing apparatus of the present invention, a printing apparatus 1 which is a tape printer connected to a personal computer 2 will be exemplified. First, the printing apparatus 1 and the personal computer 2 will be described with reference to FIGS. 1 and 2. FIG. 1 is a block diagram showing the principal electrical configuration of the printing apparatus 1. FIG. 2 is a block diagram showing the principal electrical configuration of the personal computer 2.

As shown in FIG. 1, the printing apparatus 1 includes mainly a control portion 30, a sensor portion 40, a print mechanism 50 and a power supply portion 60 equipped with a battery. The control portion 30 includes a CPU 32 for controlling each portion of the printing apparatus 1, an I/O interface 31 connected to this CPU 32 through a data bus 37, a ROM 33 which stores various kinds of programs, a RAM 34 for storing various flags, parameters and print data sent from the personal computer 2 and a CGROM 35 which stores graphic data.

A tape which is a print medium is supplied in a form accommodated in a tape cassette as indicated in Japanese Patent Application Laid-Open No. 6-91964, and whether or not any tape is present is determined depending on whether or not its cassette tape is present. Further, a cover not shown in the figure is constructed to be capable of opening/closing, so as to cover the tape cassette mounted on the main body. This cover protects the main body or the tape cassette from damage when the operator tries to replace the tape cassette or do other similar thing during a print by mistake.

The sensor portion 40 includes a tape detecting sensor 41 for detecting the presence/absence of the tape cassette, a cover open sensor 42 for detecting whether the main body cover of the printing apparatus 1 is open or closed, a cutter sensor 43 which is provided, when the fixed blade and the movable blade of the cutter 55 constructed in a scissors shape is in an open state, for detecting whether or not the movable blade is located at a predetermined cutting preparation position which the movable blade should be located at, and a battery voltage sensor 44 for detecting the voltage of the battery. Each sensor of the sensor portion 40 is connected to the control portion 30 through the I/O interface 31 and a detection result is outputted to the control portion 30. Because the detection methods of the tape detecting sensor 41, the cover open sensor 42 and the cutter sensor 43 are similar to a conventionally known tape printer, description thereof is omitted. Further, the battery voltage sensor 44 detects the voltage of the battery and if the voltage is 10V-15V, it is determined to be normal by the CPU 32.

The print mechanism 50 includes a thermal head 51, a drive circuit 52 for driving this thermal head 51, a tape feeding motor 53, a drive circuit 54 for driving this tape feeding motor 53, a cutter 55 for cutting a printed tape and a drive circuit 56 for driving this cutter 55. The drive circuit 52, the drive circuit 54 and the drive circuit 56 are connected to the control portion 30 through the I/O interface 31 and the print mechanism 50 executes print following an instruction from the control portion 30.

In printing with a thermal head, if outside temperature is so low that a sufficient temperature is not reached when print is executed, for example, in the winter or in a cold region, sometimes the printing result is blurred, and this is noticeable in the print result just after the print is started. As a method for avoiding such a fault, it can be considered to change print control corresponding to a result of detected temperature of the environment. A method of preheating the thermal head without any complicated print control is also available. By means of these methods, even if the print is started immediately when print data is sent from a connected computer, an excellent print without blur can be achieved. The method of preheating the thermal head is excellent in that it can be achieved with a simple configuration without any complicated control, but conventionally, the preheating has been carried out even when the print is disabled because the cover is opened or no tape cassette is loaded. Because, according to the embodiment of the present invention, the preheating can be carried out only when the print is enabled with a configuration described later, there is an effect that waste power consumption can be suppressed.

Further, a display controller (LCDC) 23 for controlling data displayed on a LCD 22 which is a display unit, a keyboard 21 which is an input unit and an external connection interface 36 for connecting to an external unit such as the personal computer 2 or the like are connected to the I/O interface 31. A cable is connected to the external connection interface 36 and then connected to the personal computer 2. In the meantime, if the printing apparatus 1 is used in only a configuration to be connected to an external unit such as the personal computer 2, the LCD 22, the LCDC 23 or the keyboard 21 may be omitted.

The power supply portion 60 is connected to the control portion 30, the sensor portion 40, the print mechanism 50, the LCD 22 and the keyboard 21 so as to supply power to the entire printing apparatus 1. When the power is turned ON by turning ON the main power supply, the electric power is supplied to all the control portion 30, the sensor portion 40, the print mechanism 50, the LCD 22 and the keyboard 21. When the power is turned OFF with the main power supply not turned ON, sleep mode or energy saving mode in which the electric power is supplied only to the control portion 30 and the sensor portion 40 is turned ON, so that receiving of a detection signal (described later) from the personal computer 2 or detection processing on each sensor is carried out.

Next, as shown in FIG. 2, the personal computer 2 is provided with a CPU 71 for controlling the personal computer 2. A ROM 72 which stores a program such as BIOS to be executed by the CPU 71 through a bus 79, a RAM 73 which stores data temporarily, a CD-ROM drive 74 in which a CD-ROM 741 which is a data storage medium is inserted so as to read data stored therein, and a HDD 75 which is a data-storage memory device are connected to the personal computer 2. The HDD 75 includes a program storage area for storing various programs to be executed by the personal computer 2, a program-related information storage area which stores information such as settings, initial values and data necessary for execution of the program.

Further, an external connection interface 76 for communication with an external unit including the printing apparatus 1, a display control portion 77 for executing screen display processing on the display 771 for displaying an operating screen to the operator and a keyboard 781 and a mouse 782 for operator's input operation are connected to the CPU 71 through the bus 79, and an input detection portion 78 for detecting those inputs is connected thereto. Then, the personal computer 2 sends a detection signal for detecting what external unit is connected thereto through the external connection interface 76 periodically when and after it is started and receives a signal returned from the external unit corresponding to that detection signal so as to determine the state of the connected unit.

Next, the automatic power turning-ON processing in the printing apparatus 1 will be described with reference to FIG. 3. FIG. 3 is a flowchart showing a flow of the automatic power turning-ON processing in the printing apparatus 1. When the processing is started as shown in FIG. 3, the printing apparatus 1 turns into sleep mode or energy saving mode in which electric power is supplied only to the control portion 30 and the sensor portion 40 so as to carry out various initialization processings such as initializing the storage area of the RAM 34 or returning to an initial value (S1).

Next, whether or not the power key provided on the printing apparatus 1 main body is pressed by the operator is determined (S3). If the power key is pressed (S3: YES), the procedure proceeds to S15, in which the main power supply is turned ON as per normal. If the power key is not pressed (S3: NO), whether or not a detection signal sent from the personal computer 2 is received is determined (S5). If the detection signal is not received (S5: NO), the procedure returns to S3.

If the detection signal is received (S5: YES), whether or not printable condition is satisfied in S7-S13 is checked in order to confirm whether or not the main power supply may be turned ON. First, whether or not the main body cover of the printing apparatus 1 is closed is determined according to an output from the cover open sensor 42 (S7). If the main cover is not closed (S7: NO), the procedure returns to S3 because it cannot be said that the printable condition is present.

If the main cover is closed, and print is enabled (S7: YES), whether or not the tape cassette is loaded normally is determined according to an output from the tape detecting sensor 41 (S9). If the tape cassette is not loaded (S9: NO), the procedure returns to S3 because it cannot be said that the printable condition is present.

If the tape is normal (S9: YES), whether or not the cutter for cutting the tape is in a state of functioning normally is determined depending on the output from the cutter sensor 43 (S11). If the cutter is not normal (S11: NO), the tape cannot be cut when the print is executed, which is inconvenient and determined not to be in a printable state, and therefore the procedure returns to S3. The condition which enables the cutter to function normally is a condition in which the cutter is disposed at a predetermined cutting preparation position, and this arrangement position is detected by the cutter sensor 43, which, then, output a signal indicating that it is normal.

If the cutter is normal (S11: YES), whether or not the battery voltage is within a normal range is determined based on the output from the battery voltage sensor (S13). If the battery is not within the normal voltage range, according to this embodiment, in a range of 10 V-15 V (S13: NO), that is determined not to be in a printable state, and then the procedure returns to S3.

If the battery is in the normal voltage range (S13: YES), all the printable conditions are satisfied in the determination subsequent from S7 and after, and therefore the power supply is turned ON by turning ON the main power supply (S15). By this processing, not only the control portion 30 or the sensor portion 40 but also the print mechanism 50 and other portions are supplied with electric power, so that the entire printing apparatus 1 is supplied with electric power.

Next, the print preparation processing is executed in order to receive print data from the personal computer 2 (S17). In the print preparation processing, heating of the thermal head 51 is started, and a variety of print preparation processing to be executed when the main power supply is turned ON is executed. Then, whether or not print data is received from the personal computer 2 is determined (S19) and if the print data is received (S19: YES), the print processing is executed (S21) and after the print processing ends, the procedure returns to S19 so as to wait again for a transmission of the print data. If the print data is not received (S19: NO), the system waits in the state of S19 until it receives it.

In this embodiment, the printable conditions include four conditions: whether or not the cover is closed (S7), whether or not the tape cassette is loaded normally (S9), whether or not the cutter is normal (S11) and whether or not the battery voltage is in the normal range (S13), but all these conditions are not always the printable conditions. These may be set appropriately depending on the kind of the printing apparatus 1 and the operating condition. In case of not the tape printer but a printing apparatus using ordinary paper, the quantity of remainder of paper is detected instead of the tape cassette loading condition. In this case, the check on the cutter is not necessary because usually no cutter is provided. Although, if any print condition is not satisfied, the system is so constructed to wait for the power key to be operated without turning ON the power immediately, it is permissible to turn ON the power to notify an error by means of a lamp or buzzer in order to call attention to the operator.

As described above, the printing apparatus 1 of this embodiment checks output from the sensor portion 40 if the personal computer 2 which is a connection destination sends a detection signal even if the operator does not turn ON the main power supply so as to verify whether or not the system is in a printable state and if it is determined that the system is in the printable state, it automatically turns ON the power so as to supply electric power to each section. Thus, labor and hour for the operator to turn ON the power is not necessary, and the print preparation processing such as heating of the thermal head 51 can be executed in advance of a case of turning ON the main power supply after the print data is sent. As a result, time required until the print is executed after a print instruction is received can be shortened. Further, because the main power supply is not turned ON unless the print condition is not satisfied, wasting of power can be avoided.

The CPU 32 which executes cover opening/closing check processing in S7, tape loading check processing in S9, cutter check processing in S11 and battery check processing in S13 of FIG. 3 functions as printable condition determining means of the present invention. Further, the CPU 32 which executes the power ON processing in S15 of FIG. 3 functions as power-ON means of the present invention. The CPU 32 which executes the print preparation processing in S17 of FIG. 3 functions as control means of the present invention.

Further, as another embodiment of the present invention, the present invention can be applied to a known laser printer. In a known laser printer, toner is fixed on paper by heating on last stage of printing with a fixing device (fuser) which is one of major components constituting the print head. Because about several minutes are required until this fixing device is heated to an appropriate temperature, if it is intended to start the print immediately after print data is sent from the computer, the heating needs to be finished at that time. Thus, conventionally, the heating is always carried out and when no print is made, electric power for heating is consumed. Further, even if print is disabled because papers are completely consumed or the cover is opened, heating is always carried out regardless of that condition and consequently, electric power is wasted. If the fixing device is heated as the print preparation processing by applying the present invention to such a laser printer, the system can be constructed to be heated only when the printable condition is satisfied and consequently, there is an effect that waste of power can be reduced.

BRIEF DESCRIPTION OF THE DRAWINGS

FIG. 3 is a flowchart showing flow of automatic power turning-ON processing in the printing apparatus 1.

DESCRIPTION OF REFERENCE NUMERAL

Figure 1:
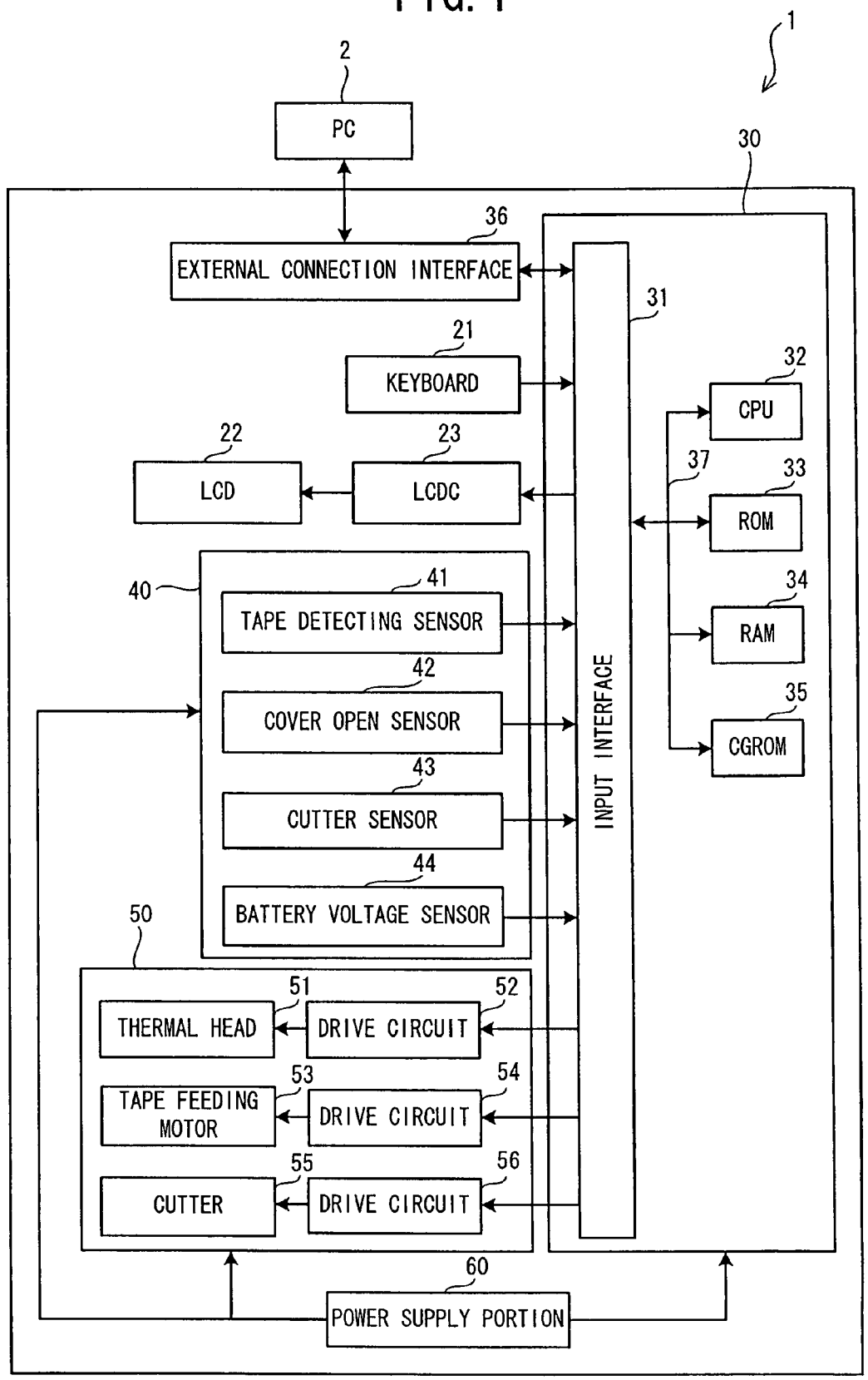
FIG. 1 is a block diagram showing a main electric configuration of the printing apparatus 1.
Figure 2:
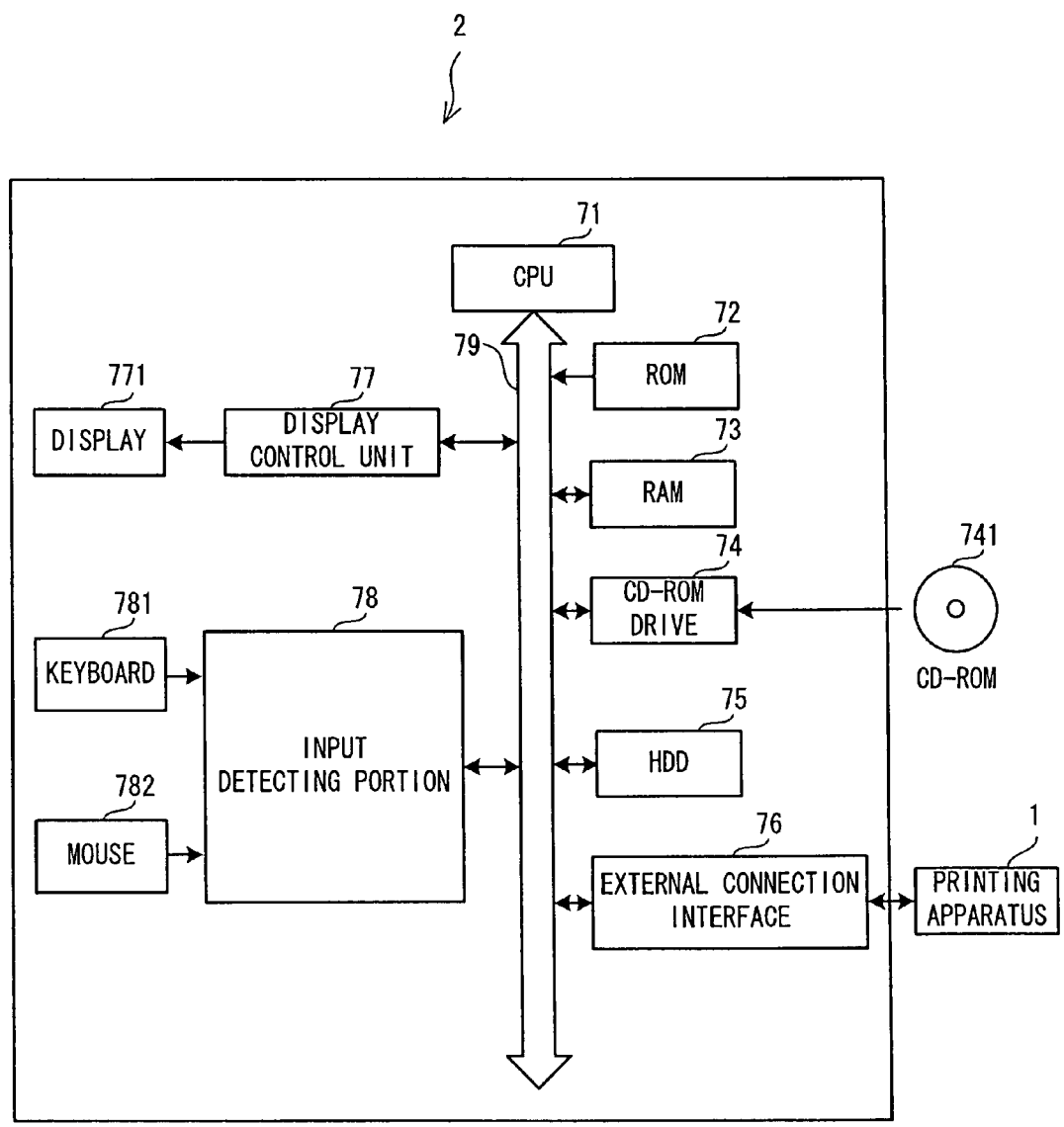
FIG. 2 is a block diagram showing the main electric configuration of the personal computer 2.

1: Printing apparatus
2: Personal computer
30: Control portion
32: CPU
33: ROM
36: External connection interface
40: Sensor portion
41: Tape detecting sensor
42: Cover open sensor
43: Cutter sensor
44: Battery voltage sensor
50: Print mechanism
51: Thermal head
60: Power supply portion

The invention claimed is:

1. A printing apparatus connected to a computer and for printing on a substrate by actuating a print head based on print data sent from the computer, comprising:
a detection signal receiving device that receives a detection signal for detecting the printing apparatus transmitted from the computer;
a printable condition determining device that, when the detection signal is received by the detection signal receiving device, determines whether or not a predetermined printable condition is satisfied;
a power-ON device that, when it is determined that the printable condition is satisfied by the printable condition determining device, turns ON the main power supply of the printing apparatus; and
a control device that executes print preparation processing after the main power supply is turned ON by the power-ON device;
wherein when the power-ON device turns ON the main power supply of the printing apparatus, the printing apparatus is in sleep mode or energy saving mode in which electric power is supplied only to the control device and the detection signal receiving device; and
wherein the printing apparatus includes a power supply equipped with a battery, and when the power supply is started, first, the printing apparatus turns into sleep mode or energy saving mode in which electric power is supplied only to the control device and the detection signal receiving device.

2. The printing apparatus according to claim 1, wherein the control device always preheats the print head after the main power supply is turned ON by the power-ON device.

3. The printing apparatus according to claim 1, wherein the printable condition determining device determines that the predetermined printable condition is satisfied when a substrate is properly loaded on the printing apparatus.

4. The printing apparatus according to claim 1, wherein the printable condition determining device determines that the predetermined printable condition is satisfied when the main body cover of the printing apparatus is closed.

5. The printing apparatus according to claim 1, wherein the printable condition determining device determines that the predetermined printable condition is satisfied when a cutting device that cuts a substrate functions normally.

6. The printing apparatus according to claim 1, wherein the printable condition determining device determines that the predetermined printable condition is satisfied when a battery functions normally.

7. A non-transitory computer-readable storage medium including a computer control program for a printing apparatus connected to the computer and for printing on a substrate by actuating a print head based on print data sent from the computer, wherein the program comprises:
a detection signal receiving step of receiving a detection signal for detecting the printing apparatus transmitted from the computer;
a printable condition determining step of determining whether or not a predetermined printable condition is satisfied when the detection signal is received on the detection signal receiving step;
a power-ON step of turning ON the main power supply of the printing apparatus when it is determined that the printable condition is satisfied on the printable condition determining step; and
a print preparation processing step of executing print preparation processing after the main power supply is turned ON on the power-ON step;
wherein when the power-ON device turns ON the main power supply of the printing apparatus, the printing apparatus is in sleep mode or energy saving mode in which electric power is supplied only to a control device for executing the print preparation processing step and a detection signal receiving device for performing the detection signal receiving step; and
wherein the printing apparatus includes a power supply equipped with a battery, and when the power supply is started, first, the printing apparatus turns into sleep mode or energy saving mode in which electric power is supplied only to the control device and the detection signal receiving device.

8. The non-transitory computer-readable storage medium according to claim 7, wherein the print preparation processing step always preheats the print head after the main power supply is turned ON on the power-ON step.

9. The non-transitory computer-readable storage medium according to claim 7, wherein the printable condition determining step determines that the predetermined printable condition is satisfied when a substrate is properly loaded on the printing apparatus.

10. The non-transitory computer-readable storage medium according to claim 7, wherein the printable condition determining step determines that the predetermined printable condition is satisfied when the main body cover of the printing apparatus is closed.

11. The non-transitory computer-readable storage medium according to claim 7, wherein the printable condition determining step determines that the predetermined printable condition is satisfied when a cutting device that cuts a substrate functions normally.

12. The non-transitory computer-readable storage medium according to claim 7, wherein the printable condition determining step determines that the predetermined printable condition is satisfied when a battery functions normally.

* * * * *